United States Patent
Prabhakaran et al.

(10) Patent No.: US 9,135,101 B2
(45) Date of Patent: Sep. 15, 2015

(54) VIRTUAL FUNCTION TIMEOUT FOR SINGLE ROOT INPUT/OUTPUT VIRTUALIZATION CONTROLLERS

(71) Applicant: LSI CORPORATION, San Jose, CA (US)

(72) Inventors: Rajesh Prabhakaran, Norcross, GA (US); Moby J. Abraham, Lilburn, GA (US); Chennakesava Arnoori, Norcross, GA (US); Atul Mukker, Suwanee, GA (US)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 374 days.

(21) Appl. No.: 13/798,525

(22) Filed: Mar. 13, 2013

(65) Prior Publication Data
US 2014/0250338 A1   Sep. 4, 2014

Related U.S. Application Data

(60) Provisional application No. 61/771,465, filed on Mar. 1, 2013.

(51) Int. Cl.
*G06F 11/07* (2006.01)

(52) U.S. Cl.
CPC .................................. *G06F 11/0757* (2013.01)

(58) Field of Classification Search
CPC ............... G06F 2213/0026; G06F 2213/0058; G06F 2213/3808; G06F 11/0757; G06F 11/0793

USPC ........................................................... 714/56
See application file for complete search history.

(56) References Cited

U.S. PATENT DOCUMENTS

| | | |
|---|---|---|
| 2009/0144731 A1 | 6/2009 | Brown et al. |
| 2010/0306420 A1* | 12/2010 | Johnson et al. ................. 710/22 |
| 2012/0166699 A1* | 6/2012 | Kumar et al. ................. 710/306 |
| 2012/0246644 A1 | 9/2012 | Hattori et al. |
| 2013/0046911 A1* | 2/2013 | Mine et al. ..................... 710/267 |
| 2013/0229421 A1* | 9/2013 | Cheng et al. ................. 345/522 |

* cited by examiner

*Primary Examiner* — Jigar Patel
(74) *Attorney, Agent, or Firm* — Duft Bornsen & Fettig LLP; Gregory T. Fettig

(57) ABSTRACT

Systems and methods presented herein provide for resetting a controller in a Single Root Input/Output Virtualization (SR-IOV) architecture. The architecture includes a physical function that periodically issues a heartbeat command to a physical function of an SR-IOV controller, starts a first timer, determines a firmware failure of the controller upon expiration of the first timer, and issues a command to reset the firmware of the controller. The architecture also includes a plurality of a virtual function drivers coupled to a plurality of virtual functions of the controller. Each virtual function driver periodically issues a heartbeat command to its corresponding virtual function, starts a second timer having a duration that is less than a duration of the first timer, determines a firmware failure of the controller upon expiration of the second timer, and pauses input/output operations to its corresponding virtual function until the firmware of the controller is reset.

18 Claims, 4 Drawing Sheets

VIRTUAL FUNCTION TIMEOUT FOR SINGLE ROOT INPUT/OUTPUT VIRTUALIZATION CONTROLLERS

CROSS REFERENCE TO RELATED APPLICATIONS

This patent application claims priority to, and thus the benefit of an earlier filing date from, U.S. Provisional Patent Application No. 61/771,465 (filed Mar. 1, 2013), the entire contents of which are hereby incorporated by reference.

FIELD OF THE INVENTION

The invention generally relates to the field of Peripheral Component Interconnect Express (PCIe) controllers and more particularly to the controlled timeout of virtual functions of a PCIe controller employing Single Root Input/Output Virtualization (SR-IOV).

BACKGROUND

SR-IOV is an extension to the PCIe specification. SR-IOV allows a controller to separate access to its resources via a Physical Function (PF) and a plurality of Virtual Functions (VFs). A PF is the primary function of the controller and publishes the controller's SR-IOV capabilities. The VFs virtualize the controller's hardware capabilities to provide a multiple host environment by independently operating with guest operating systems much like single controllers coupled to a host operating system. The VFs, implemented in the controller's firmware, communicate with the PF to share the hardware capabilities of the actual controller and become unresponsive when the controller is reset. Thus, when an SR-IOV controller performs a reset (e.g., as initiated by the PF), the controller ungracefully disconnects the VFs.

SUMMARY

Systems and methods presented herein provide for resetting the firmware of a SR-IOV controller. The architecture includes a physical function driver of a host operating system communicatively coupled to a physical function of the SR-IOV controller. The physical function driver is operable to periodically issue a heartbeat command to the physical function, start a first timer, to determine a firmware failure of the controller upon expiration of the first timer, and to issue a command to reset the firmware of the controller. The SR-IOV architecture also includes a plurality of virtual function drivers correspondingly operable within a plurality of guest operating systems and coupled to a plurality of virtual functions of the controller. Each virtual function driver is operable to periodically issue a heartbeat command to its corresponding virtual function, start a second timer having a duration that is less than a duration of the first timer, to determine a firmware failure of the controller upon expiration of the second timer, and to pause input/output operations to its corresponding virtual function until the firmware of the controller is reset.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
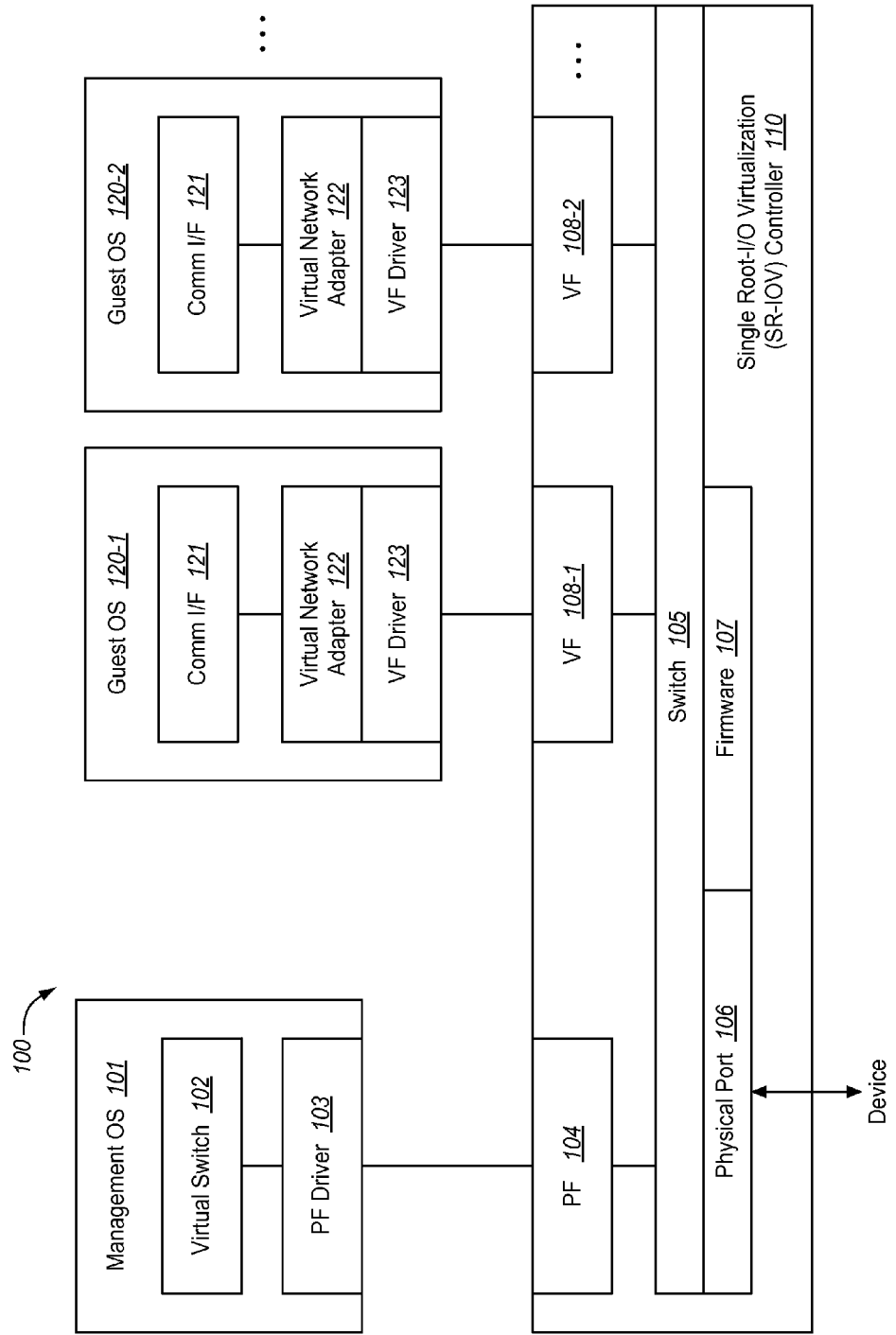
FIG. 1 is a block diagram of an exemplary SR-IOV architecture.

FIG. 1 is a block diagram of an exemplary SR-IOV architecture 100. The SR-IOV architecture 100 includes an SR-IOV controller 110 operable to provide hardware functionality through a physical function PF 104 to a plurality of virtual functions VF 108-1-108-2 operable with guest operating systems (OSs) 120-1-120-2. For example, the PF 104 is associated with a virtual switch 102, such as a "Hyper-V" parent switch, operable within a host/management OS 101 to partition Input/Output (I/O) operations through the SR-IOV controller 110 into a virtualized environment for the guest OSs 120-1-120-2.

The PF 104 interfaces with the management OS 101 through a PF driver 103 such that the management OS 101 can issue commands to the SR-IOV controller 110. An example of such occurs when the firmware 107 of the SR-IOV controller 110 fails, thereby halting I/O operations of the guest OSs 120-1-120-2 through the controller 110. At this point, the PF driver 103 issues a command to the PF 104 to reinitialize the firmware 107 of the SR-IOV controller 110 such that I/O operations of the guest OSs 120-1-120-2 may resume. Thus, the SR-IOV controller 110 is any system, device, software, or commendation thereof operable to virtualize its hardware functions, such as I/O processing, for a plurality of guest OSs 120-1-120-2.

Each VF 108 is associated with the PF 104. Each VF 108 shares one or more physical resources of the controller 110, such as a memory, switching capabilities of the switch 105, and the physical pork 106 which couples to a device. Each VF 108 communicates with its corresponding guest OS 123 through a VF driver 123. For example, a guest OS 120 may issue an I/O request through a communication interface 121, such as a TCP/IP interface. A virtual network adapter 122 may format the I/O request of the guest OS 120 for processing and routing by the SR-IOV controller 110. Because each VF 108 is assigned to a child partition via the virtual switch 102, network traffic flows directly between the VF 108 and its child partition to the device connected to the physical pork 106.

When the SR-IOV controller 110 experiences a firmware 107 failure, the PF driver 103 issues a command to reinitialize the firmware 107 of the controller 110. This usually occurs as the result of a heartbeat command from the PF driver 103 to the controller 110. For example, the PF driver 103 may periodically issue a heartbeat command to the controller 110 to determine whether the firmware 107 is operational and processing I/O requests of the guest OSs 120-1-120-2. If the firmware 107 fails, the controller 110 is incapable of responding to the heartbeat command thereby "timing out" a first timer established by the PF driver 103. After the first timer expires, the PF driver 103 issues a reset command to the controller 110 to reinitialize the firmware 107 such that I/O operations of the guest OSs 120-1-120-2 may resume.

Although shown or described with respect to a certain number of guest OSs 120, VFs 108, etc., the invention is not intended to be limited to any particular number of elements shown and described herein. Other operable aspects of the SR-IOV architecture 100 are shown and described in the flowchart of FIG. 2.

Figure 2:
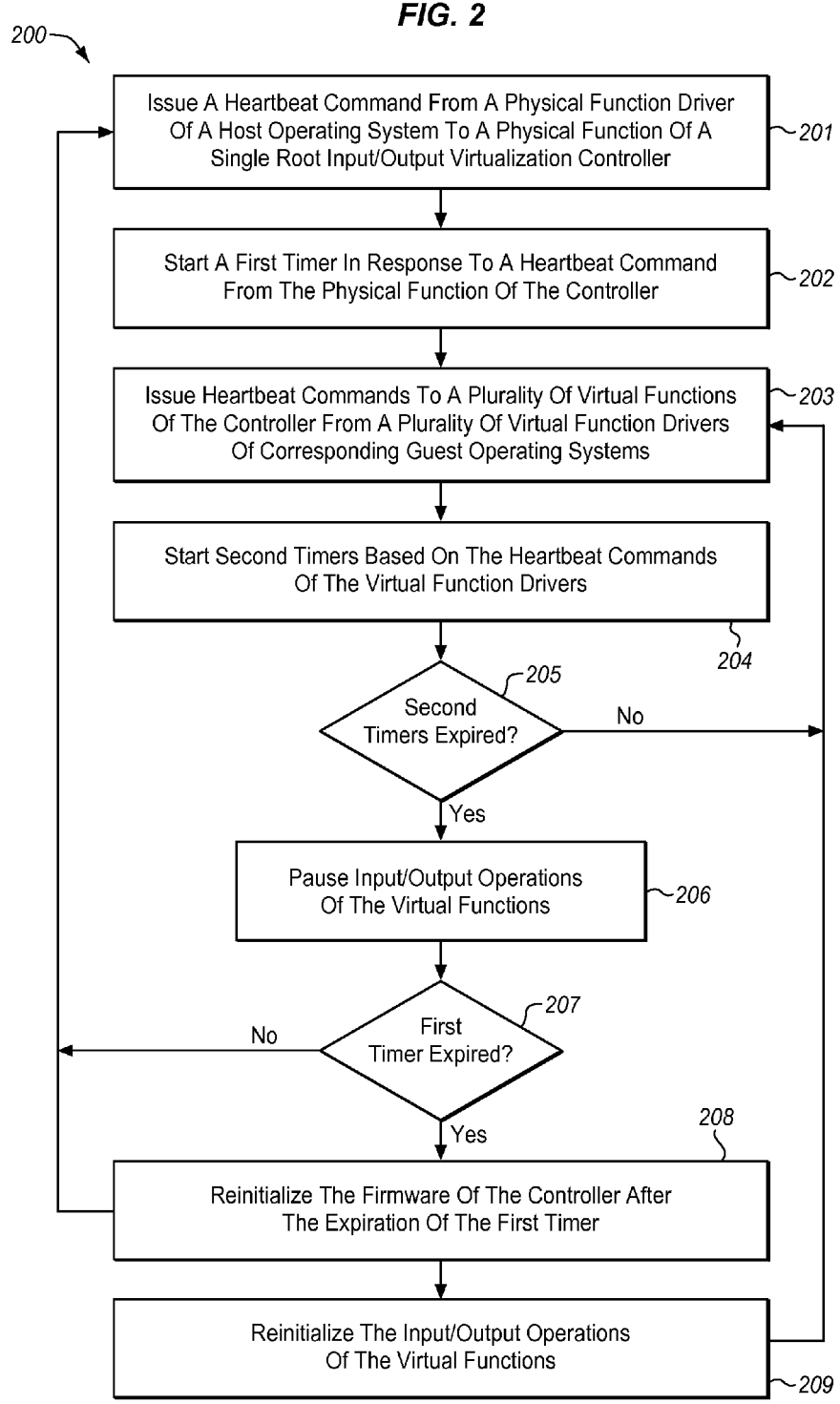
FIG. 2 is a flowchart of a process operable within the SR-IOV architecture of FIG. 1.

FIG. 2 is a flowchart of a process 200 operable within the SR-IOV architecture 100 of FIG. 1. The process 200 of the SR-IOV architecture 100 generally occurs during normal I/O operations of the guest OSs 120 through their respective VF drivers 123 in communication with the VFs 108 of the controller 110. During this operation, the PF driver 103 issues a heartbeat command to the PF 104 of the controller 110, in the process element 201. In doing so, the PF driver 103 starts a first timer to establish a period between the issuance of a subsequent heartbeat command, in the process element 202. For example, when a heartbeat command is issued to the controller 110, the controller to the PF driver 103 to indicate that the controller 110 this functioning properly. If it does not respond within a certain period of time, the controller 110 has experienced a firmware failure of the firmware 107. The PF driver 103 within reset the firmware 107 of the controller to restart the I/O operations of the guest OSs 120.

In the process element 203, the VF drivers 123 of their respective guest OSs 120 also issue heartbeat commands to a plurality of corresponding virtual functions 108 of the controller 110. These heartbeat commands operate in a similar manner to the manner that is similar to the heartbeat commands issued by the PF driver 103. In this regard, the VF drivers 123 start their own timers, in the process element 204 to determine whether the firmware 107 of the controller 110 has indeed failed.

To further illustrate, the guest OSs 120-1 and 120-2 do not communicate with one another as part of the virtualization scheme implemented by the controller 110. Thus, if the guest OS 120-1 were to detect that the firmware 107 of the controller 110 had failed, the guest OS 120-2 would be completely unaware. Moreover, the PF driver 103 is also precluded from communicating with the VF drivers 123. Thus, if the PF driver 103 detected a failure of the firmware 107, both the guest OSs 120-1 and 120-2 would be unaware of the firmware failure. And, the PF driver 103 upon detecting the firmware failure would issue a command to reset the firmware 107 of the controller 110 without indicating such to the VF drivers 123. Accordingly, the VF drivers 123 would be ungracefully disconnected from I/O operations through their corresponding VFs 108. The VF drivers 123, therefore start their own timers to make their own determinations of the operability of the firmware 107 of the controller 110.

In the process element 205, VF drivers 123 determine whether their corresponding VFs 108 responded to the heartbeat command within the appropriate amount of time established by the timers. That is, the VF drivers 123 may check a register or memory of the VF 108 while the timer is running to determine if the VF 108 has responded to the heartbeat command. If their timers have expired and no response by the VFs 108 has been detected, the VF drivers 123 pause there I/O operations to the VFs 108 of the controller 110, in the process element 206. Otherwise, the VF drivers 123 issue another heartbeat command to their corresponding VFs 108, in the process element 203.

The timers established by VF drivers 123 have a duration that is less than the timer established by the PF driver 103. This allows the VF drivers 123 to more gracefully pause the I/O operations to their corresponding VFs 108, as opposed to the PF driver 103 resetting the controller 110 without their knowledge and dramatically shutting off the I/O operations. Thus, if the second timers have expired, the PF driver 103 will also know that the firmware 107 has failed as its timer will have expired as well (i.e., the process element 207). And, once the timer of the PF driver 103 has expired, the PF driver will issue a command to reinitialize the firmware 107 of the controller 110, in the process element 208. Otherwise, the PF driver 103 will issue another heartbeat command to the PF 104, in the process element 201.

If the PF driver 103 issued a command to reinitialize the firmware 107 of the controller 110, the VFs 108 will indicates such to their corresponding VF drivers 123. The VF drivers 123 will then reinitialize the I/O operations to the VFs 108, in the process element 209. An example of the timing that may be used to implement the above functionality is shown and further described in FIG. 3.

Figure 3:
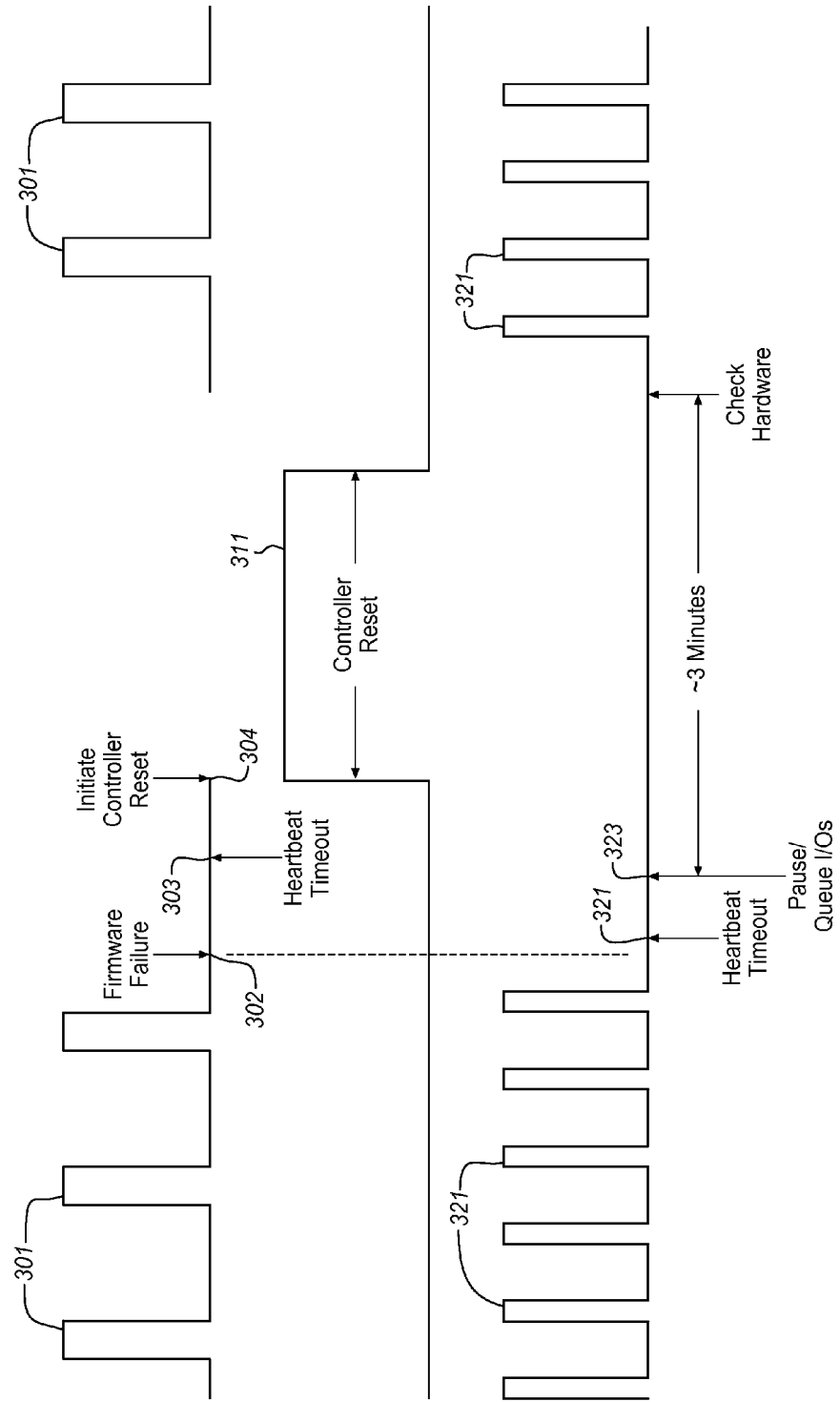
FIG. 3 is an exemplary timing diagram of the SR-IOV architecture of FIG. 1.
Figure 4:
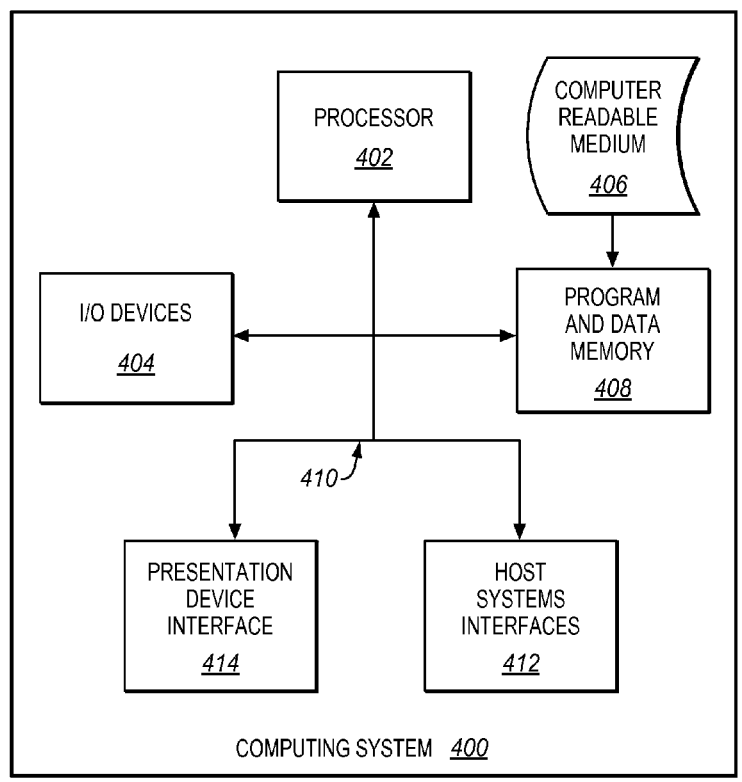
FIG. 4 illustrates a computing system in which a computer readable medium provides instructions for performing methods herein.

FIG. 3 is an exemplary timing diagram of the SR-IOV architecture 100 of FIG. 1. In this embodiment, the PF driver 103 issues the heartbeat commands 301 at a rate of once every two minutes while the VF driver 123 issues a heartbeat command 321 once per minute. After some amount of time, the firmware 107 of the controller 110 experiences a failure at the time 302, occurring before the heartbeat timeout is recognized by the PF driver 103. However, as the VF drivers 123 issue heartbeat commands 321 at a faster rate, the heartbeat timeout is detected by the VF drivers 123 at a time 322 before the heartbeat timeout is detected by the PF driver 103 at the time 303. Thus, the VF drivers 123 can pause I/O operations of their respective guest OSs 120 on their own and queue the I/O requests until the controller 110 is reinitialized (e.g., at the time 323).

Afterwards, the PF driver 103 detects the heartbeat timeout at the time 303 and initiates a controller reset of the controller 110 at the time 304. For example, the PF driver 103 issues a reset command of the controller 110 s (about two minutes after the heartbeat timeout) such that the firmware 107 may reinitialize in resume I/O operations. As a reset of the controller 110 with take some time to complete (e.g., duration 311), the VF drivers 123 cease access to all the hardware functionality of the controller 110 for about three minutes. After such time, the VF drivers 123 check the hardware functionality of the controller 110 to determine if the controller is operational. If so, the VF drivers 123 begin reissuing heartbeat commands 303 as does the PF driver 103 with the heartbeat commands 301. Otherwise, the VF drivers 123 determine that there is a serious error with the controller 110 and completely halt execution of all I/O operations through the VFs 108.

In one embodiment, the VF drivers 123 and the PF driver 103 can be configured to allow a certain number of presets to occur before deeming the controller 100 permanently disabled. For example, the PF driver 103 may be configured to issue a certain number of reset commands to allow the controller 110 multiple attempts at resetting and reinitializing the firmware 107 two resume I/O operations. If the controller 110 cannot be reinitialized after, for example, three attempts, then the PF driver 103 and the VF drivers 123 deem m the controller 100 and temporarily disabled and halt all I/O operations through the controller 110.

Additionally, the PF driver 103 may be configured to initiate a crash such that the VF drivers 123 may gracefully exit I/O operations through the controller 110. For example, on the possibility that the PF driver 103 experiences a heartbeat timeout before the VF drivers 123, the PF driver 103 may send a command, such as 0x000000E2, to the PF 104. In response to a heartbeat command by the VF drivers 123, the VFs 108 may return the command of the PF driver 103 indicating that the PF driver 103 has detected a crash of the firmware 107 and that the VF driver 123 should suspend I/O operations. The VF drivers 123, in turn, cease the I/O operations of their respective guest OSs 120 until the PF driver 103 can issue a reset of the firmware 107 as described above.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 9 illustrates a computing system 600 in which a computer readable medium 606 may provide instructions for performing any of the methods disclosed herein.

Furthermore, the invention can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computing system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the data processing system to become coupled to other data processing systems, such as through host systems interfaces 612, or remote printers or storage devices through intervening private or public networks. Modems, cable modem and Ethernet cards are just a few of the currently available types of network adapters.

What is claimed is:

1. A Single Root Input/Output Virtualization architecture, comprising:
   a Single Root Input/Output Virtualization controller;
   a physical function driver of a host operating system communicatively coupled to a physical function of the Single Root Input/Output Virtualization controller, wherein the physical function driver is operable to periodically issue a heartbeat command to the physical function, start a first timer, to determine a firmware failure of the controller upon expiration of the first timer, and to issue a command to reset the firmware of the controller; and
   a plurality of virtual function drivers correspondingly operable within a plurality of guest operating systems and coupled to a plurality of virtual functions of the controller, wherein each virtual function driver is operable to periodically issue a heartbeat command to its corresponding virtual function, start a second timer having a duration that is less than a duration of the first timer, to determine a firmware failure of the controller upon expiration of the second timer, and to pause input/output operations to its corresponding virtual function until the firmware of the controller is reset.

2. The architecture of claim 1, wherein:
   each virtual function is further operable to detect an operational mode of the firmware after reset by the physical function driver.

3. The architecture of claim 1, wherein:
   each virtual function is further operable to continue issuing the heartbeat command to the firmware after the firmware has been reset.

4. The architecture of claim 1, wherein:
   the physical function driver is further operable to manually initiate a crash of the controller.

5. The architecture of claim 1, wherein:
   each virtual function driver is further operable to queue Input/Output requests of their respective guest operating systems until the firmware of the controller is reset.

6. The architecture of claim 1, wherein:
   each virtual function driver is further operable to cease Input/Output operations to the controller after a predefined number of firmware resets by the physical function driver.

7. A method, operable within a Single Root Input/Output Virtualization architecture, the method comprising:
   issuing a heartbeat command from a physical function driver of a host operating system to a physical function of a Single Root Input/Output Virtualization controller;
   starting a first timer based on the heartbeat command of the physical function driver;
   issuing heartbeat commands to a plurality of virtual functions of the controller from a plurality of virtual function drivers correspondingly residing in a plurality of guest operating systems;
   starting second timers based on the heartbeat commands of the virtual function drivers, wherein the second timers have a duration that is less than a duration of the first timer;
   detecting a firmware failure of the controller based on expirations of the timers;
   pausing Input/Output operations of the virtual function drivers to the virtual functions of the controller after the expirations of the second timers;
   reinitializing the firmware of the controller after the expiration of the first timer; and
   reinitializing the Input/Output operations of the virtual function drivers to the virtual functions after the firmware of the controller is reinitialized.

8. The method of claim 7, further comprising:
   detecting an operational mode of the firmware with the virtual function drivers after reset by the physical function driver.

9. The method of claim 7, further comprising:
continuing to issue the heartbeat commands from the virtual function drivers to the firmware after the firmware has been reset.

10. The method of claim 7, further comprising:
initiating a crash of the controller via the physical function driver.

11. The method of claim 7, further comprising:
with the virtual function drivers, queuing Input/Output requests of their respective guest operating systems until the firmware of the controller is reset.

12. The method of claim 7, further comprising:
with the virtual function drivers, ceasing Input/Output operations to the controller after a pre-defined number of firmware resets by the physical function driver.

13. A non-transitory computer readable medium comprising instructions that, when executed by a processor in a Single Root Input/Output Virtualization architecture, direct the processor to:
issue a heartbeat command from a physical function driver of a host operating system to a physical function of a Single Root Input/Output Virtualization controller;
start a first timer based on the heartbeat command of the physical function driver;
issue heartbeat commands to a plurality of virtual functions of the controller from a plurality of virtual function drivers correspondingly residing in a plurality of guest operating systems;
start second timers based on the heartbeat commands of the virtual function drivers, wherein the second timers have a duration that is less than a duration of the first timer;
detect a firmware failure of the controller based on expirations of the timers;
pause Input/Output operations of the virtual function drivers to the virtual functions of the controller after the expirations of the second timers;
reinitialize the firmware of the controller after the expiration of the first timer; and
reinitialize the Input/Output operations of the virtual function drivers to the virtual functions after the firmware of the controller is reinitialized.

14. The computer readable medium of claim 13, wherein the instructions further directing processor to:
detect an operational mode of the firmware with the virtual function drivers after reset by the physical function driver.

15. The computer readable medium of claim 13, wherein the instructions further directing processor to:
continue to issue the heartbeat commands from the virtual function drivers to the firmware after the firmware has been reset.

16. The computer readable medium of claim 13, wherein the instructions further directing processor to:
initiate a crash of the controller via the physical function driver.

17. The computer readable medium of claim 13, wherein the instructions further directing processor to:
with the virtual function drivers, queue Input/Output requests of their respective guest operating systems until the firmware of the controller is reset.

18. The computer readable medium of claim 13, wherein the instructions further directing processor to:
with the virtual function drivers, cease Input/Output operations to the controller after a pre-defined number of firmware resets by the physical function driver.

* * * * *